(12) United States Patent
Englert et al.

(10) Patent No.: US 7,481,894 B2
(45) Date of Patent: Jan. 27, 2009

(54) SOLDERING FLUX FOR SOLDERING ALUMINUM

(75) Inventors: Peter Englert, Bad Friedrichshall (DE); Wolfgang Heeb, Schorndorf (DE); Wolfgang Knödler, Waiblingen (DE)

(73) Assignee: Behr GmbH & Co. KG, Stuttgart (DE)

( * ) Notice: Subject to any disclaimer, the term of this patent is extended or adjusted under 35 U.S.C. 154(b) by 0 days.

(21) Appl. No.: 10/483,338

(22) PCT Filed: Feb. 24, 2003

(86) PCT No.: PCT/EP03/01849

§ 371 (c)(1),
(2), (4) Date: Jan. 12, 2004

(87) PCT Pub. No.: WO03/076123

PCT Pub. Date: Sep. 18, 2003

(65) Prior Publication Data

US 2004/0163734 A1    Aug. 26, 2004

(30) Foreign Application Priority Data

Mar. 8, 2002    (DE) ................................ 102 10 133

(51) Int. Cl.
*B23K 35/362*    (2006.01)
(52) U.S. Cl. ...................................................... 148/26
(58) Field of Classification Search .................. 148/23, 148/26
See application file for complete search history.

(56) References Cited

U.S. PATENT DOCUMENTS

| | | | |
|---|---|---|---|
| 2,686,354 A | | 8/1954 | Lundin |
| 2,829,078 A | * | 4/1958 | Aull et al. .................... 75/253 |
| 4,941,929 A | * | 7/1990 | Tecle .......................... 148/24 |
| 5,052,612 A | * | 10/1991 | Tecle .......................... 228/207 |
| 5,100,048 A | * | 3/1992 | Timsit ........................ 228/198 |
| 5,584,946 A | | 12/1996 | Karmaschek et al. |
| 5,759,707 A | * | 6/1998 | Belt et al. .................... 428/552 |
| 5,795,659 A | | 8/1998 | Meelu et al. |
| 5,962,145 A | | 10/1999 | Matsukawa |
| 5,985,233 A | * | 11/1999 | Belt et al. .................... 423/465 |
| 6,207,125 B1 | * | 3/2001 | Seseke-Koyro et al. ...... 423/485 |
| 6,350,424 B1 | * | 2/2002 | Belt et al. ..................... 423/465 |
| 6,432,221 B1 | | 8/2002 | Seseke-Koyro et al. |
| 6,664,508 B1 | * | 12/2003 | Johnson et al. ..... 219/137 WM |
| 2003/0102359 A1 | * | 6/2003 | Seseke-Koyro et al. ...... 228/223 |

FOREIGN PATENT DOCUMENTS

| | | |
|---|---|---|
| DE | 199 13 111 A1 | 9/1999 |
| DE | 100 15 486 A1 | 10/2001 |
| EP | 0 260 713 A1 | 3/1988 |
| EP | 0 659 519 B1 | 9/2001 |
| JP | 03-151192    * | 6/1991 |
| JP | 03155495    * | 7/1991 |
| JP | 07-232268 A | 9/1995 |
| JP | 07-303858 A | 11/1995 |
| JP | 61-206593    * | 9/1996 |
| SU | 585227    * | 12/1977 |
| WO | WO 00/73014 A1 | 12/2000 |
| WO | WO03/076123 A1 * | 9/2003 |

OTHER PUBLICATIONS

English abstract of SU 585227, publication date Dec. 21, 1977.*
ASM Handbook, vol. 6, Welding, Brazing, and Soldering, 1993, pp. 60 and 62.*
Abstract of Japanese patent document 03-155495.*
English translation of JP 61-206593 (previously faxed to attorney and scanned into docket).*
English translation of SU 585,227 (previously faxed to attorney and scanned into docket).*
Patent Abstracts of Japan, vol. 015, No. 381, Sep. 26, 1991, JP 03-155495, Jul. 3, 1991.
Patent Abstracts of Japan, vol. 015, No. 378, Sep. 24, 1991, JP 03-151192, Jun. 27, 1991.
Patent Abstracts of Japan, vol. 011, No. 039, Feb. 5, 1987, JP 61-206593, Sep. 12, 1986.
Patent Abstracts of Japan, vol. 015, No. 310, Aug. 8, 1991, JP 03-114663, May 15, 1991.
Patent Abstracts of Japan, vol. 013, No. 020, Jan. 18, 1989, JP 63-230297, Sep. 26, 1988.

* cited by examiner

*Primary Examiner*—Roy King
*Assistant Examiner*—Tima M McGuthry-Banks
(74) *Attorney, Agent, or Firm*—Foley & Lardner LLP

(57) ABSTRACT

The invention relates to a soldering flux based on potassium fluoroaluminates, wherein the zirconium fluoride and/or titanium fluoride is added to the soldering flux. The invention also relates to a corresponding soldering method.

16 Claims, No Drawings

SOLDERING FLUX FOR SOLDERING ALUMINUM

The invention relates to a soldering flux for soldering aluminum in accordance with the preamble of claim 1.

It is known to join two metallic workpieces, in particular aluminum heat exchangers, to one another using potassium fluoroaluminates ($K_{1-3}AlF_{4-6}$), as is marketed in particular under the trade name NOCOLOK Flux®, with the potassium fluoroaluminates simultaneously serving both as a soldering flux and as a solder. In this case, the potassium fluoroaluminate in particular has the following composition, in percent by weight: K 28-31%, Al 16-18%, F 49-53%, Fe max. 0.03%, Ca max. 02.%, $H_2O$ (550° C.) max. 2.5%. To produce a soldered joint, after cleaning potassium fluoroaluminates are applied to individual parts or assembled modules as an aqueous suspension by means of spray fluxing (flooding, spraying or dipping), excess flux is removed by being blown off and the flux is then dried in order to prevent excessive moisture levels in the furnace. Alternatively, electrostatic fluxing (or dry fluxing) is possible, with potassium fluoroaluminates applied in dry form. Then, the workpieces are continuously and uniformly heated to the soldering temperature, the potassium fluoroaluminates melt and dissolve the oxide layer from the aluminum just before the solder melts and the soldered joint is formed. This is followed by cooling, with the potassium fluoroaluminates solidifying after the solder has been formed. The soldering takes place under a nitrogen shielding gas atmosphere.

Furthermore, numerous protective rights or protective rights applications relating to the surface treatment of aluminum are known. For example, U.S. Pat. No. 5,795,659 describes a treatment of the aluminum surface with zirconium, hafnium, rhenium, manganese, titanium, silicates and borates to protect against corrosion and high-temperature corrosion. U.S. Pat. No. 5,584,946 describes a pretreatment and surface treatment process based on complex fluorides of the elements boron, zirconium, hafnium and titanium. U.S. Pat. No. 5,962,145 describes a surface treatment process based on complex fluorides of the elements boron, zirconium, titanium, silicon, germanium, tin in combination with polymers.

Furthermore, there are numerous protective rights or protective rights applications relating to reactive and functional fluxes. For example, WO 00/73014 A1 discloses the application of an aluminum-silicon compound to components made from aluminum or aluminum alloys by the application and heating of alkali metal hexafluorosilicate which does not require any braze-cladding. The aluminum-silicon solder formation is to occur with the addition of fluoridic soldering fluxes during the heating of the component. DE 199 13 111 A1 has disclosed a soldering flux which substantially comprises alkali metal fluorozincate or alkali metal fluoride/zinc fluoride mixtures, the zinc content producing a corrosion-resistant surface. DE 100 154 86 A1 discloses potassium-containing and cesium-containing soldering fluxes, specifically potassium or cesium fluorostannates, for soldering magnesium-containing aluminum materials. EP 0 659 519 B1 has disclosed a zinc-containing soldering flux for improving the resistance to corrosion.

Soldering fluxes of this type still leave something to be desired.

Working on the basis of this prior art, it is an object of the invention to provide an improved soldering flux.

This object is achieved by a process having the features of claim 1. Advantageous configurations form the subject matter of the subclaims.

According to the invention, zirconium fluoride and/or titanium fluoride is added to a soldering flux based on potassium fluoroaluminates, in particular having a composition, in percent by weight (before the additive is added), of K 28-31%, Al 16-18%, F 49-53%, Fe max. 0.03%, Ca max. 02.%, $H_2O$ (550° C.) max. 2.5%, to the soldering flux. The use of the additives firstly improves the resistance to corrosion without any special pretreatment or aftertreatment being required. Rather, the resistance to corrosion is imparted in a single operation by the application of the soldering flux. Secondly, the addition of titanium fluoride improves the adhesion of any coating which may subsequently be applied. The formation of odors is also reduced and the water discharge is optimized.

The zirconium fluoride and/or titanium fluoride content, after addition, is preferably in each case 0.1 to 10% by weight, preferably 0.2 to 5% by weight, in particular 0.5 to 3% by weight, of the soldering flux, with optimum resistance to corrosion being achieved in the range between 0.5 and 3% by weight.

It is preferable for at least one metal from transition group 4 or 5 of the periodic system and/or an oxidic and/or fluoridic compound thereof or a mixture thereof to be added to the soldering flux; this applies in particular to titanium, zirconium, hafnium and/or vanadium.

It is preferable for boron, manganese, silicon, rhenium and/or an oxidic and/or fluoridic compound thereof to be added to the soldering flux. In this case, the further additive(s) in each case form(s) 0.1 to 10% by weight, preferably 0.2 to 5% by weight, in particular 0.5 to 3% by weight, of the soldering flux.

The invention is explained briefly below on the basis of two exemplary embodiments.

Potassium fluoroaluminates ($K_{1-3}AlF_{4-6}$), as are marketed in particular under the trade name NOCOLOK Flux®, the composition of which has been described above, serve as the basis for the soldering flux according to the invention. Metal compounds, in particular metal fluorides, are added to the potassium fluoroaluminates; according to the first exemplary embodiment, zirconium fluoride is added. Approx. 0.1 to 3% by weight thereof is added. This optimizes the soldering flux in such a manner that the soldering process forms a functional surface which provides protection against corrosion. A further addition of a small quantity of titanium fluorides inter alia improves the adhesion of a subsequent coating.

According to a second exemplary embodiment, titanium fluoride is added, in particular in an amount of 0.5 to 3% by weight, to the potassium fluoroaluminates.

Further additives, as listed in particular in the introduction to the description, are possible in both exemplary embodiments.

The soldering is carried out in a known way, but there is no need for a special pretreatment or after treatment to achieve protection against corrosion, since the soldering flux already has suitable protective properties.

The invention claimed is:

1. A soldering flux for soldering aluminum, consisting essentially of:
   an amount of titanium fluoride between 0.1 to 10% by weight of the soldering flux, sufficient to reduce corrosion on an aluminum part which is soldered and to which the soldering flux is pre-applied,
   at least one oxide selected from the group consisting of a titanium oxide, a zirconium oxide, a boron oxide, and a silicon oxide, and
   a balance of potassium fluoroaluminate.

2. The soldering flux as claimed in claim 1, wherein the titanium fluoride forms 0.5 to 3% by weight of the soldering flux.

3. The soldering flux as claimed in claim 1, wherein the soldering flux further consists essentially of at least one metal from transition group 4 or 5 of the periodic system and/or an oxidic and/or fluoridic compound thereof or a mixture thereof.

4. The soldering flux as claimed in claim 3, wherein the soldering flux further consists essentially of titanium, zirconium, hafnium and/or vanadium and/or an oxidic and/or fluoridic compound thereof.

5. The soldering flux as claimed in claim 1, wherein the soldering flux further consists essentially of boron and/or an oxidic and/or fluoridic compound thereof.

6. The soldering flux as claimed in claim 1, wherein the soldering flux further consists essentially of manganese and/or an oxidic and/or fluoridic compound thereof.

7. The soldering flux as claimed in claim 1, wherein the soldering flux further consists essentially of silicon and/or an oxidic and/or fluoridic compound thereof.

8. The soldering flux as claimed in claim 1, wherein the soldering flux further consists essentially of rhenium and/or an oxidic and/or fluoridic compound thereof.

9. The soldering flux as claimed in claim 1, wherein the soldering flux consists essentially of one or more further additive(s) each or which form(s) 0.1 to 10% by weight of the soldering flux.

10. A soldering process for soldering aluminum, comprising soldering two aluminum pieces to each other, at least one of which has applied thereto soldering flux as claimed in claim 1.

11. A soldering flux according to claim 1, further consists essentially of zirconium fluoride.

12. An aluminum part to which a soldering flux has been applied in preparation for soldering, wherein the soldering flux comprises a soldering flux as defined according to claim 1.

13. The soldering flux as claimed in claim 1, wherein the at least one oxide is a titanium oxide.

14. The soldering flux as claimed in claim 1, wherein the at least one oxide is a zirconium oxide.

15. The soldering flux as claimed in claim 1, wherein the at least one oxide is a boron oxide.

16. The soldering flux as claimed in claim 1, wherein the at least one oxide is a silicon oxide.

* * * * *